United States Patent
Mukherjee et al.

(10) Patent No.: US 11,061,461 B2
(45) Date of Patent: *Jul. 13, 2021

(54) POWER MANAGEMENT OF NETWORKED DEVICES

(71) Applicant: Dhaani Systems, Cupertino, CA (US)

(72) Inventors: Shankar Mukherjee, Cupertino, CA (US); Jean Walrand, Berkeley, CA (US); Nicholas Bambos, Hillsborough, CA (US)

(73) Assignee: Dhaani Systems, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/909,619

(22) Filed: Mar. 1, 2018

(65) Prior Publication Data

US 2019/0073018 A1 Mar. 7, 2019

Related U.S. Application Data

(63) Continuation of application No. 15/276,573, filed on Sep. 26, 2016, now abandoned, which is a
(Continued)

(51) Int. Cl.
*G06F 1/3234* (2019.01)
*H04W 52/02* (2009.01)
(Continued)

(52) U.S. Cl.
CPC ............ *G06F 1/3234* (2013.01); *G06F 1/266* (2013.01); *G06F 1/3287* (2013.01); *H04W 52/02* (2013.01);
(Continued)

(58) Field of Classification Search
CPC ...... G06F 1/3234; G06F 1/3287; G06F 1/266; H04W 52/02; H04W 52/0258; H04W 52/0216; H04W 52/0254; H04W 52/0212; H04W 52/0209; Y02D 70/166; Y02D 70/146; Y02D 70/23; Y02D 70/142; Y02D 70/1222; Y02D 70/00
See application file for complete search history.

(56) References Cited

U.S. PATENT DOCUMENTS

| 5,949,974 A | 9/1999 | Ewing |
| 6,144,992 A | 11/2000 | Turpin et al. |

(Continued)

FOREIGN PATENT DOCUMENTS

| JP | H11-178247 | 7/1999 |
| JP | 2000-152522 | 5/2000 |

(Continued)

OTHER PUBLICATIONS

Examination Report dated Jul. 23, 2013 from Japanese Application No. 2011-507616, 4 pages.
(Continued)

*Primary Examiner* — Peter P Chau
(74) *Attorney, Agent, or Firm* — Pillsbury Winthrop Shaw Pittman LLP

(57) ABSTRACT

A network-centric, power management system and method is disclosed for monitoring and controlling device nodes attached to a network. The monitoring and controlling includes collecting and processing information available on the network about the device nodes and using the collected information to manage power on the device nodes.

25 Claims, 8 Drawing Sheets

Related U.S. Application Data continuation of application No. 13/942,586, filed on Jul. 15, 2013, now Pat. No. 9,454,209, which is a continuation of application No. 12/114,721, filed on May 2, 2008, now Pat. No. 8,488,500.

(51) Int. Cl.
  *G06F 1/26* (2006.01)
  *G06F 1/3287* (2019.01)

(52) U.S. Cl.
  CPC ... *H04W 52/0216* (2013.01); *H04W 52/0258* (2013.01); *H04W 52/0209* (2013.01); *H04W 52/0212* (2013.01); *H04W 52/0254* (2013.01); *Y02D 30/70* (2020.08)

(56) References Cited

U.S. PATENT DOCUMENTS

| | | |
|---|---|---|
| 6,449,462 B1 | 9/2002 | Gunnarsson et al. |
| RE39,284 E | 9/2006 | Marisetty |
| 7,117,495 B2 | 10/2006 | Blaser et al. |
| 7,174,471 B2 | 2/2007 | Kormarla et al. |
| 7,260,728 B2 | 8/2007 | Chang et al. |
| RE39,837 E | 9/2007 | Marisetty |
| 8,549,333 B2 | 10/2013 | Jackson |
| 9,810,493 B2 | 11/2017 | Fluhr |
| 2002/0010808 A1 | 1/2002 | Wiggins et al. |
| 2002/0072868 A1 | 6/2002 | Bartone et al. |
| 2002/0144162 A1 | 10/2002 | Tada |
| 2002/0188877 A1 | 12/2002 | Buch |
| 2003/0005341 A1 | 1/2003 | Terunuma |
| 2003/0009705 A1 | 1/2003 | Thelander et al. |
| 2003/0018921 A1 | 1/2003 | Garcia et al. |
| 2003/0055969 A1 | 3/2003 | Begun et al. |
| 2003/0084358 A1 | 5/2003 | Bresniker et al. |
| 2004/0039630 A1 | 2/2004 | Begole et al. |
| 2004/0078153 A1 | 4/2004 | Bartone et al. |
| 2004/0119608 A1 | 6/2004 | Rao et al. |
| 2004/0162642 A1 | 8/2004 | Gasper et al. |
| 2004/0163000 A1 | 8/2004 | Kuhlmann et al. |
| 2004/0198302 A1 | 10/2004 | Hutchison et al. |
| 2005/0032536 A1 | 2/2005 | Wei et al. |
| 2005/0049760 A1 | 3/2005 | Narayanaswami et al. |
| 2005/0125519 A1 | 6/2005 | Yang et al. |
| 2005/0165853 A1 | 7/2005 | Turpin et al. |
| 2005/0215274 A1 | 9/2005 | Matson et al. |
| 2005/0268121 A1 | 12/2005 | Rothman et al. |
| 2005/0280576 A1 | 12/2005 | Shemesh |
| 2006/0031454 A1 | 2/2006 | Ewing et al. |
| 2006/0136562 A1 | 6/2006 | Tung |
| 2006/0159090 A1 | 7/2006 | Chang et al. |
| 2006/0206738 A1 | 9/2006 | Jeddeloh et al. |
| 2006/0218178 A1 | 9/2006 | Cannon et al. |
| 2006/0250301 A1 | 11/2006 | Yamakoshi et al. |
| 2006/0259201 A1 | 11/2006 | Brown |
| 2007/0005995 A1 | 1/2007 | Kardach et al. |
| 2007/0037609 A1 | 2/2007 | Zhang et al. |
| 2007/0050654 A1 | 3/2007 | Switzer et al. |
| 2007/0079154 A1 | 4/2007 | Diefenbaugh et al. |
| 2007/0143640 A1 | 6/2007 | Simeral et al. |
| 2007/0168683 A1 | 7/2007 | Guo et al. |
| 2007/0195723 A1 | 8/2007 | Attar et al. |
| 2007/0220294 A1 | 9/2007 | Lippett |
| 2007/0250731 A1 | 10/2007 | Romero et al. |
| 2008/0002603 A1 | 1/2008 | Hutsell et al. |
| 2008/0025273 A1 | 1/2008 | Sano |
| 2008/0028242 A1 | 1/2008 | Cepulis |
| 2008/0150680 A1 | 6/2008 | Casey et al. |
| 2009/0106571 A1 | 4/2009 | Low et al. |
| 2009/0150695 A1 | 6/2009 | Song et al. |
| 2009/0157702 A1 | 6/2009 | Harris |
| 2009/0319810 A1 | 12/2009 | Aoyama |
| 2014/0058218 A1 | 2/2014 | Randlov et al. |
| 2017/0284761 A1 | 10/2017 | Lewis |

FOREIGN PATENT DOCUMENTS

| | | |
|---|---|---|
| JP | 2002-050489 | 2/2002 |
| JP | 2003-015783 | 1/2003 |
| JP | 2003-303075 | 10/2003 |
| JP | 2004-222375 | 8/2004 |
| JP | 2005-295714 | 10/2005 |
| JP | 2003-333768 | 11/2005 |
| JP | 2007-259647 | 10/2007 |
| JP | 2008-035420 | 2/2008 |
| WO | WO 02/07365 | 1/2002 |
| WO | WO 03/007135 | 1/2003 |
| WO | WO 2008/003009 | 1/2008 |
| WO | WO 2018/067912 | 4/2018 |

OTHER PUBLICATIONS

Dhiman, et al., "Dynamic Power Management Using Machine Learning," ICCAD, Nov. 2006, San Jose, CA, ACM, 8 pages.
Dhiman, et al., "Dynamic Voltage Frequency (sic) Scaling for Multi-tasking Systems Using Online Learning," ISLPED, Aug. 2007, Portland, OR, 6 pages.
Simunic, et al., "Event-Driven Power Management," IEEE Transactions on Computer Aided Design of Integrated Circuits and Systems, vol. 20, No. 7 (Jul. 2001), pp. 841-857.
International Search Report and Written Opinion for Application No. PCT/US2009/042120, dated Dec. 22, 2009, 13 pages.
Allman, et al., "Enabling an Energy-Efficient Future Internet Through Selectively Connected End Systems," Nov. 2007, Florida, 7 pages.
Dua, et al., "Distributed Backlog-Driven Power Control in Wireless Networking," 2007, Stanford, 6 pages.
Dua, et al., "Power Managed Packet Switching," 2007, Stanford, 6 pages.
Gitzenis, et al., "Joint Transmitter Power Control and Mobile Cache Management in Wireless Computing," 2008, 15 pages.
Markopoulou, et al., "Energy-Efficient Communication in Battery-Constrained Portable Devices," 2005, Stanford, 10 pages.
Mastroleon, et al., "Autonomic Power Management Schemes for Internet Servers and Data Centers," 2005, Stanford, 5 pages.
Mastroleon, et al., "Power Aware Management of Packet Switches," 2007, Stanford, 7 pages.
Supplemental European Search Reported dated Jan. 12, 2015 from European Application No. EP 09739696, 4 pages.
EPO Communication pursuant to Article 94(3) EPC, dated Jan. 26, 2015, from European Application No. EP 09739696, 6 pages.
EPO Communication pursuant to Article 94(3) EPC, dated Jun. 8, 2015, from European Application No. EP 09739696, 4 pages.
Yolken, et al., "Power Management of Packet Switches via Differentiated Delay Targets," Stanford, published in Communications, 2008. ICC '08. IEEE International Conference on, May 19-23, 2008, 6 pages.
Harris et al., "Power Management for Stationary Machines in a Pervasive Computing Environment," Proceedings of the 38th Hawaii International Conference on System Sciences, 2005, 10 pages.
Nicholson et al., "Cost-Effective Power Management Systems," IEEE Industry Applications Magazine, vol. 6, No. 2, Mar./Apr. 2000, pp. 23-33.
Pollo, et al., "A Network-Oriented Power Management Architecture," IFIP/IEEE Eighth International Symposium, Integrated Circuits Management, Mar. 2003, pp. 693-706.

POWER MANAGEMENT OF NETWORKED DEVICES

CROSS-REFERENCE TO RELATED APPLICATIONS

This application is a continuation of U.S. patent application Ser. No. 15/276,573, filed Sep. 26, 2016, which is a continuation of U.S. patent application Ser. No. 13/942,586, filed Jul. 15, 2013 (Now U.S. Pat. No. 9,454,209), which is a continuation of U.S. application Ser. No. 12/114,721, filed May 2, 2008 (Now U.S. Pat. No. 8,488,500), the entire contents of all of which are incorporated herein by reference.

TECHNICAL FIELD

This subject matter is generally related to power management.

BACKGROUND

Conventional power management techniques used by computing devices often operate in an autonomous fashion. For example, a given device can automatically enter a power-saving mode based on a level of activity associated with the device. In a networked environment, however, a computing device can have multiple users. In an office or business environment, both a user of the device as well as a person in charge of maintenance of the device may use the device at different times. Typically, the person in charge of the maintenance is a remote user. In a home environment, multiple users may access information and/or run an application on the same device. In this case, only one of the users is co-located with the device.

Conventional autonomous power management techniques take into account current activity levels in computing devices, not activities being initiated or soon to be initiated by one or more remote users. Hence, conventional autonomous power management techniques may not be effective in a networked environment in a home or office.

SUMMARY

A network-centric, power management system and method is disclosed for monitoring and controlling device nodes attached to a network. The monitoring and controlling includes collecting and processing information available on the network about the device nodes and using the collected information to manage power on the device nodes.

The power management system and method improves power management of enterprise office computing and communication device nodes (e.g., desktop computers, phones, printers, scanners, access points, switches, etc.) in small, medium, or large enterprises, including corporations, organizations, government, etc. It also improves power management of enterprise office or building automation device nodes (e.g., sensors, actuators, cameras, alarms, etc.) that are supported by a networking and computing infrastructure. The system and method improves power management for networked device nodes used in home computing, and entertainment, as well as home automation. Power management of enterprise and home computing and building automation can yield substantial power and cost savings using the system and method.

DETAILED DESCRIPTION

Network-Centric Power Management System Overview

Figure 1:
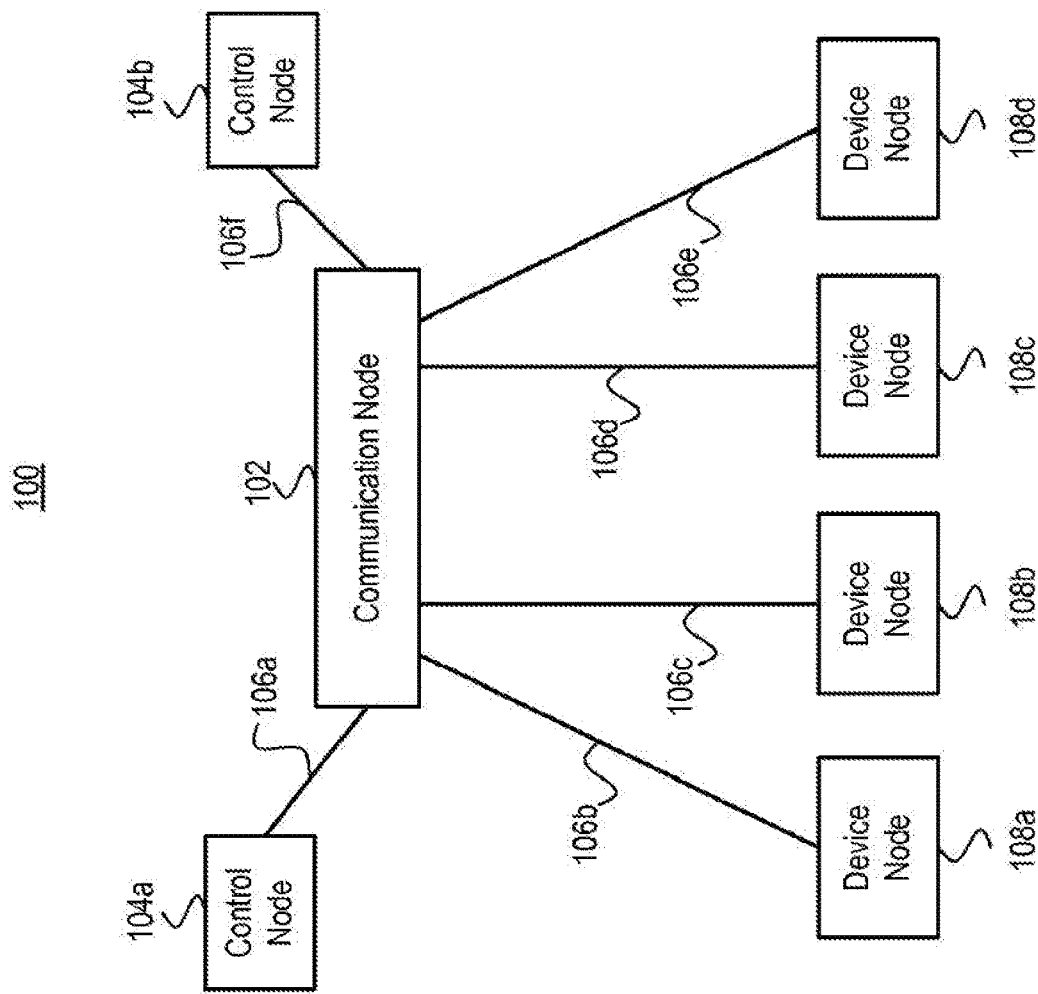
FIG. 1 is a block diagram of an example power management system.

A typical office and home has multiple devices that consume power. For example, many homes and offices are equipped with at least a computer and a printer. Because the user can use only one device at a time, the usage of each device can be low on average. Despite this low average usage, many users keep their devices on at all times resulting in a high power cost. Generally speaking, the reason to keep all devices on is that: (1) there is uncertainty as to which device the user will use next and when, and (2) the user is sensitive to waiting for a device to power up. Hence, the high power cost is traded for potential latency cost.

The system 100 can improve the power-latency tradeoff by reducing the uncertainty concerning which device (e.g., when and where) the user will use next. To reduce this uncertainty, the power management system 100 can (1) increase the volume and improve the quality of data collected about the user, (2) fuse and correlate the data for decision making, and (3) use more intelligent decision making processes for powering up/down devices in anticipation of user request for usage and input. To address the aforementioned issues, among others, the system 100 can track the user through a network and monitors the user's interactions with the network and with devices connected thereto.

The system 100 is network-centric in that it manages a network periphery of connected device nodes from the vantage point of the network, where information from various device nodes can be collected, integrated and acted upon. This approach is in contrast to conventional power management techniques that are device-centric, trying to optimize power usage on each individual device node in isolation. Therefore, conventional power management techniques miss the benefits of capturing and correlating network-wide data about the location and operational context of the user to tightly anticipate device node usage request and get user input. For example, when the power management system 100 is installed in an enterprise network detects that a user's laptop (or other mobile device) is connected to an enterprise WiFi access point that is remote from the user's office, the system 100 can determine that the user is away from the office and that the user's computer can be shutdown.

The system 100 can be non-invasive to the user's enterprise and home network architecture and operations. For example, in some implementations the system 100 may not require installing any software client on the managed device nodes (clientless). The system 100 may even be implemented in a box or appliance that can be coupled into a network and be given "read permissions" to enterprise server log files.

The system 100 can be scalable to large numbers of device nodes and robust enough to avoid disruption of enterprise or home operations due to inadvertent instability or planned attack. The system 100 can avoid "a single point of failure" by being deployed in a distributed implementation combined with managed redundancy.

Example Power Management System Architecture

FIG. 1 is a block diagram of an example power management system 100. In some implementations, the system 100 can include communication nodes 102, control nodes 104, device nodes 108 which are interconnected by communication links 106. The device nodes 108 are power-managed by the control nodes 104. The device nodes 108 and the control nodes 104 are networked through the communication nodes 102 and communication links 106. In some implementations, the communication node 102 is connected to device nodes 108a . . . 108d and control nodes 104a . . . 104b through communication links 106a . . . 106e. The communication node 102 may also be connected to other communication nodes through communication links, being part of a larger communication network.

Communication node 102 can have at least information communication capabilities and optionally information processing capabilities. The communication node 102 allows unidirectional and/or bidirectional transfer of communication messages from at least one communication port or interface to another communication port or interface. Some examples of the communication node 102 include one or more of: a wireline packet switch, a telephone switch, a wireless access point, etc.

Communication links 106 can be, for example, bidirectional or unidirectional, digital or analog, wireline (e.g., electrical, optical, Ethernet, ATM) or wireless (e.g., radio, WiFi, WiMax, GSM, satellite, optical infrared), or any combination of the above. Indeed, communication links 106 can be supported by any known communication medium and any communication technology.

Control nodes 104 can have information communication and/or processing capabilities. The control nodes 104 can have at least one communication port or interface to which at least one communication link 106 is coupled and allows information communication between the control nodes 104 and other elements of the system 100, including one or more communication nodes 102, device nodes 108, other control nodes 104, etc. For example, the control node 104a can comprise one or more processors, processing cores or microcontrollers, residing on a computer host, a computer server, or specialized electronic equipment, etc. The control node 104a can be implemented in hardware or software or a combination of both, and/or implemented as a software process or processor embedded in a larger system.

The device nodes 108 can have information communication capability and/or one or more other capabilities, including but not limited to: computing, processing, command, control, sensing, actuating, or any combination of those. The device nodes 108 can have at least one information communication port and/or interface to which a communication link 106 is coupled and allows information communication between a given device node 108 and other elements of the system 100, including one or more communication nodes 102, control nodes 104, other device nodes 108, etc. For example, a device node 108a can be one of the following devices (or a group of them) with a communication interface, which devices include but are not limited to: computers (e.g., desktop, laptop, etc.), personal digital assistants (PDAs), wireless phones, printers, scanners, home "network attached storage" devices, light switches, electrical outlets, home entertainment units (video recorders, etc.), surveillance cameras, set-top boxes, media players, etc.

In some implementations, the device nodes 108a can be power managed by at least one control node 104a, which can include a controller. For example, in FIG. 1 a control node 104a communicates with a device node 108a through the communication node 102, using communication link 106b. In other implementations, the communication node 102 may partially overlap or be embedded in a device node 108a or control node 104a and vice versa.

For example, consider a desktop computer (device 108a) which is connected through an Ethernet port to a switch (communication node 102). Connected to the computer 108a through a port (e.g., a USB port) is a printer (device 108b), which is not connected to any other device 108 but only to the computer 108a. The computer 108a is power managed by the control node 104a which is connected to the switch 102 through the Ethernet. The printer 108b is power managed by control node 104b which is also coupled to the switch 102. Note that in the previous configuration the computer 108a is the device node 108a that is power managed by the control node 104a through the switch 102. The printer is device node 108b which is power managed by the control node 104b through the switch 102 and the computer 108a. Thus the computer 108a can be both a device node 108 power managed by the control node 104a and a communication node 102 mediating power management of the printer 108b by the control node 104b.

Example Communication Nodes

Figure 2:
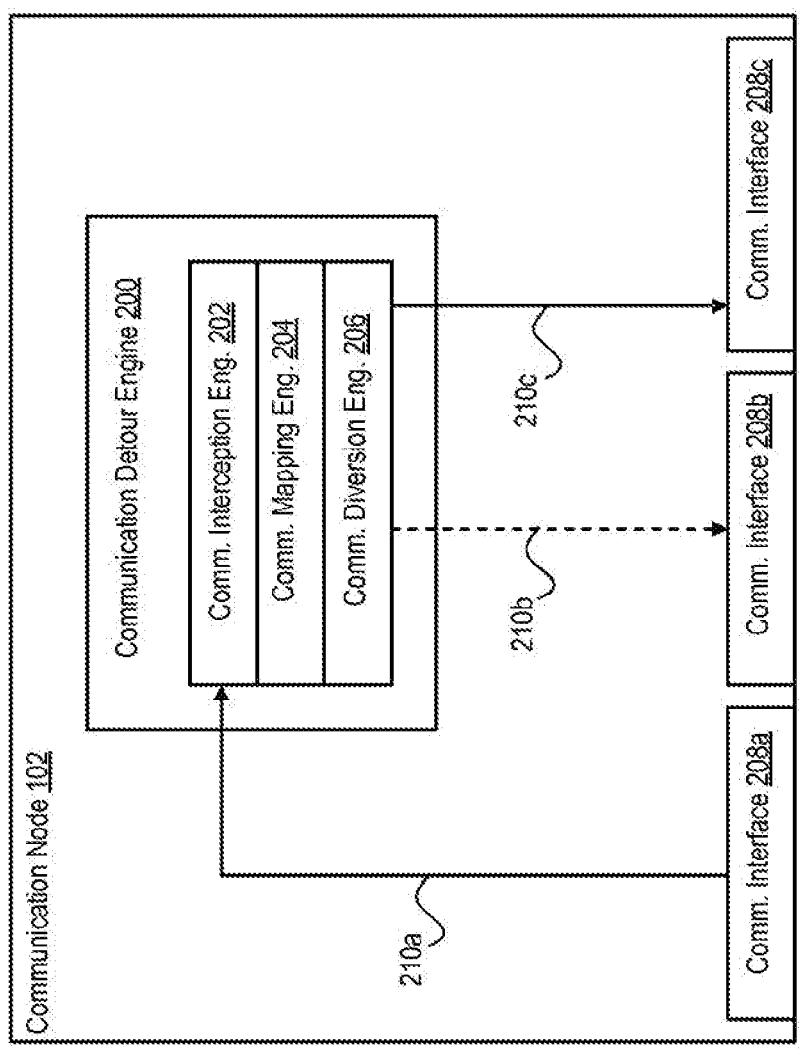
FIG. 2 is a block diagram of an example communication node of the power management system of FIG. 1.

FIG. 2 is a block diagram of an example communication node 102 of the power management system 100 of FIG. 1. In some implementations, the communication node 102 can include one or more communication interfaces 208. The communication interfaces 208 can send and/or receive messages to other communication nodes 102, control nodes 104, or device nodes 108 to which the interfaces 208 are coupled. The communication node 102 of FIG. 2 includes a communication detour engine 200, which can have the capability to: (a) intercept a communication message destined for a control node 104 by recognizing the destination address of the message, (b) remap the destination address of the incoming message to the addresses of one or more control nodes 104, and (c) divert the communication message to the control nodes 104. The communication detour engine 200 can include a communication interception engine 202, which can intercept a message arriving from a communication interface 208 through a data path 210 and destined to a device node 108. The communication detour engine 200 can also include a communication mapping engine 204, which can remap a destination address of an intercepted message to addresses of one or more control nodes 104. The communication detour engine 200 also includes a communication diversion engine 206, which is able to divert the intercepted message (with the now remapped original destination address to the addresses of one or more control nodes 104) and output it to a communication interface 208 of the communication node 102 through a data path 210. The communication interface 208 can transmit the intercepted message with a remapped destination address to the control node 104 whose address the message's original destination address has been remapped. The transmission to the control nodes 104 can occur either directly or indirectly through other communication nodes 102. The communication node 102 may have software and/or hardware components supporting functionalities, including electronic circuitry for running the software (e.g., special digital circuitry, embedded processor, microprocessor).

Example Control Nodes

Figure 3:
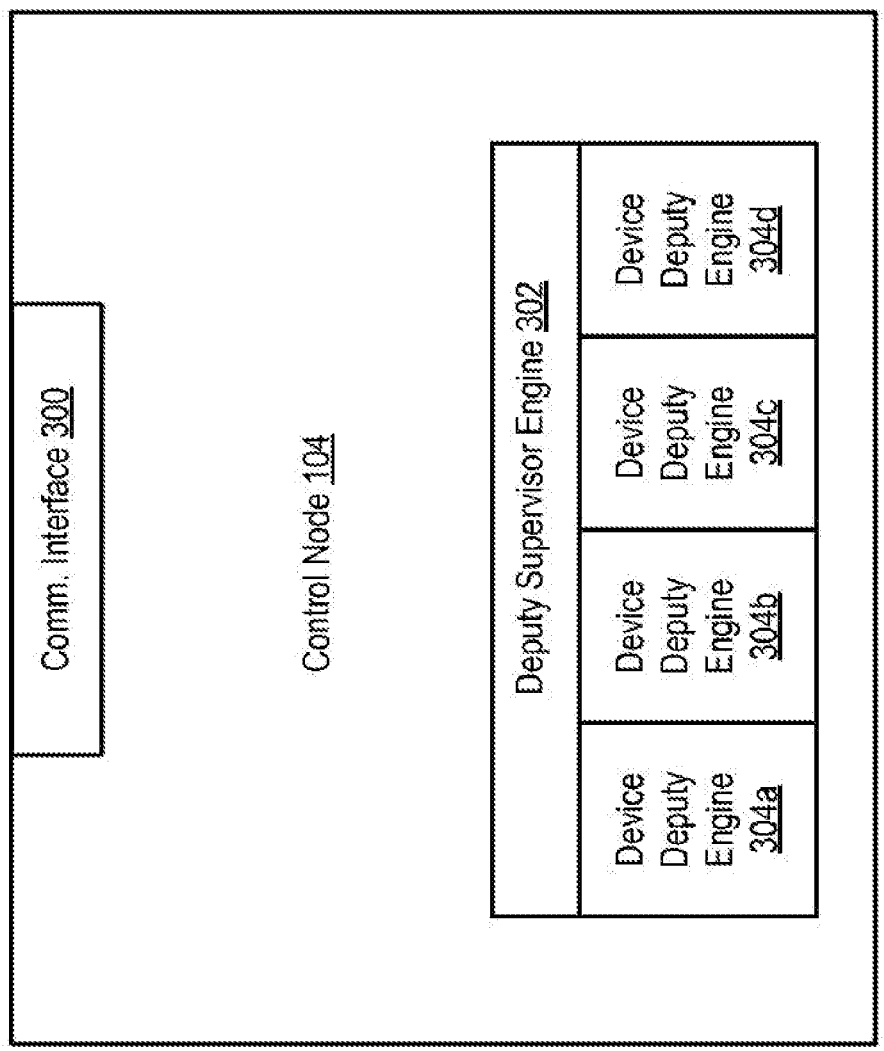
FIG. 3 is a block diagram of an example control node of the power management system of FIG. 1.

FIG. 3 is a block diagram of an example control node 104 of the power management system 100 of FIG. 1. In some implementations, the control node 104 includes at least one communication interface 300. The control node 104 can include one or more device deputy engines 304. For example, there can be one device deputy engine 304 for each device node 108 that the control node 104 controls. The device deputy engine 304 can have the capability to substitute for one or more services and/or functionalities that a device node 108 corresponding to the device deputy engine 304 shuts off or ceases having operation. The shutoff or cease of operation can occur when the device node 108 switches to a lower operational mode where less power is consumed than a higher operational mode. In particular, a device deputy engine 304 can selectively respond to a subset of incoming service requests to corresponding device node 108, which incoming service requests are being diverted to the device deputy engine 304 by the communication diversion engine 206 of the communication detour engine 200 of the communication node 102. The device node 108 also can include a deputy supervisor engine 302, which supervises and coordinates one or more device deputy engines 304 corresponding to controlled device nodes 108. The control node 104 may have software and/or hardware components supporting its functionalities, including electronic circuitry for running the software (e.g., special digital circuitry, embedded processor, microprocessor).

Example Device Nodes

Figure 4:
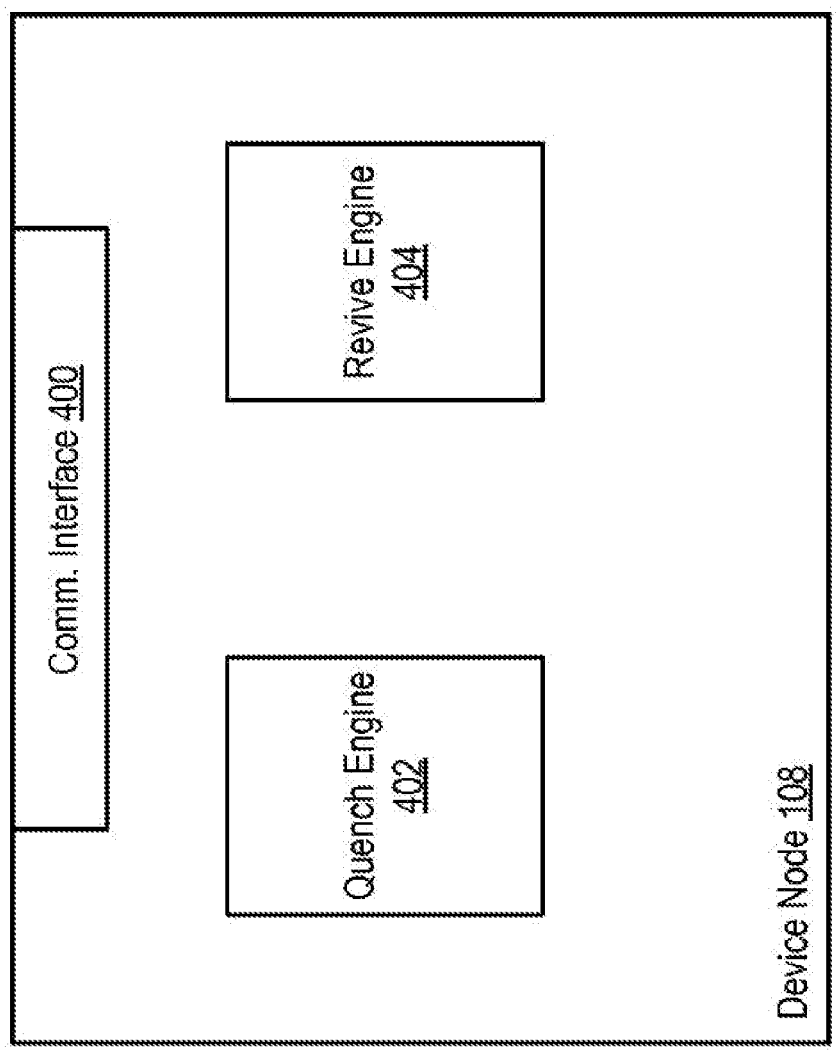
FIGS. 4 and 5 are block diagrams of an example device node of the power management system of FIG. 1.
Figure 5:
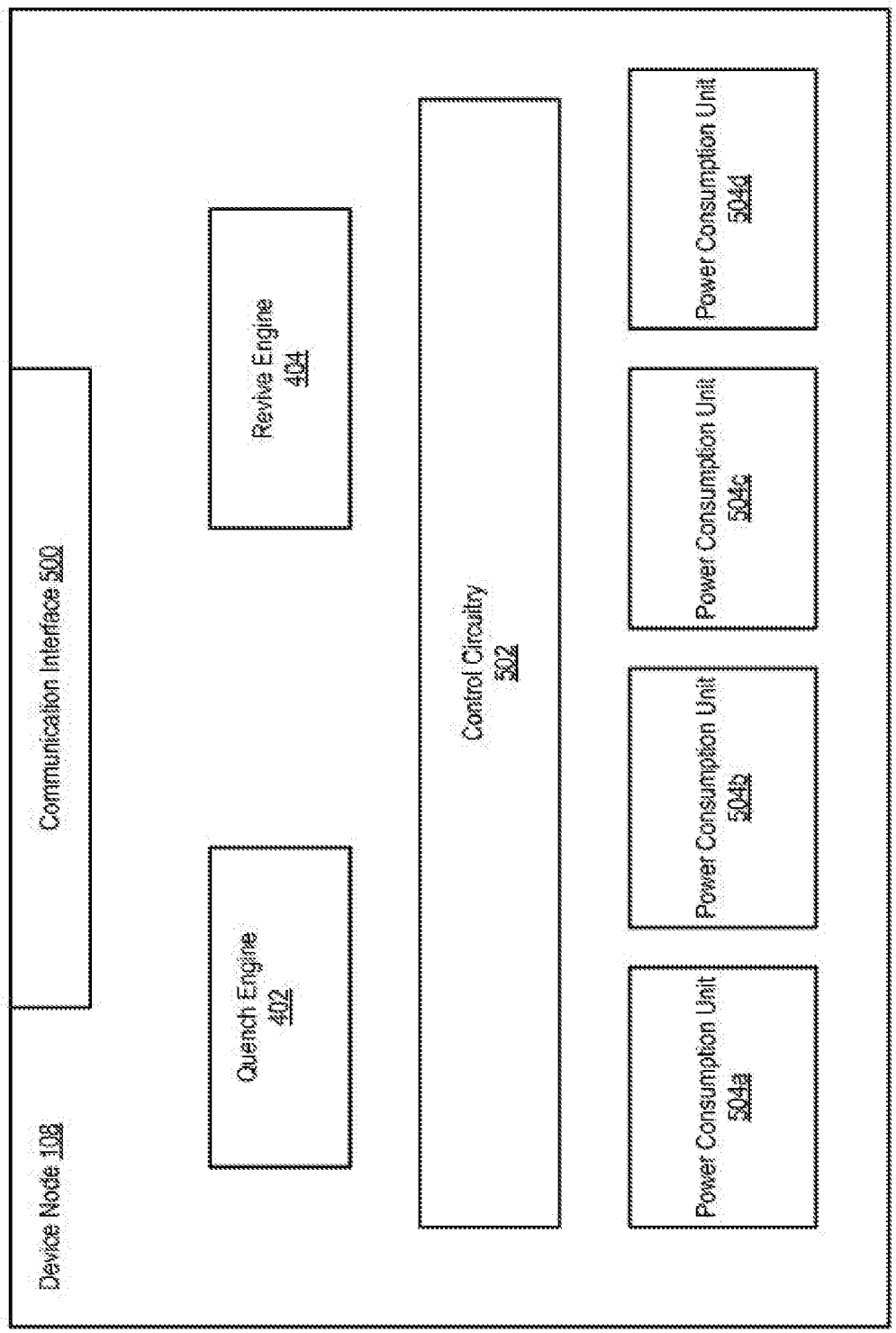

FIGS. 4 and 5 are block diagrams of an example device node 108 of the power management system 100 of FIG. 1. Referring to FIG. 4, in some implementations, a device node 108 can include at least one communication interface 400. The device node 108 can exist in one of a plurality of operational modes. At least one operational mode can be defined by services and/or functionalities of the device node 108 that remain active, services and/or functionalities of the device node 108 that are inactive or dormant, and/or overall power used during an operational mode. Note that at least two different operational states may use the same amount of power. The device node 108 can include a quench engine 402 that can switch the device node 108 to a lower operational mode that uses lower power than the previous operational mode. The switch to a lower operational mode can occur in response to commands sent by a control node 104 controlling the device node 108.

The device node 108 can include a revive engine 404 that can switch the device node 108 to a previous, higher operational mode that uses higher or equal power than the previous operational mode and has a different combination of active services and/or functionalities. Note that the device node 108 can also switch to a special operational mode where the device node 108 is fully off, such as being powered down, except for a minimal communication capability to respond to controller commands and fully on (e.g., fully powered up).

The device node 108 can have software and/or hardware components supporting functionalities of the device node 108, including electronic circuitry for running software (e.g., special digital circuitry, embedded processor, microprocessor).

Referring now to FIG. 5, further details of an example device node 108 are described. In these example implementations, the device node 108 can include one or more power consumption units 504 that consume power. Also included is electronic control circuitry 502 that controls the power consumption units 504. At least one of the power consumption units 504 can be set to one or more power consumption levels. An example power consumption mode can be that a power consumption unit 504 is completely shut off. Another example of a power consumption mode can be that a power consumption unit 504 is fully powered up. Intermediate power consumption states or modes can exist between completely shut off and fully powered up. The quench engine 402, which can be responsive to commands sent by the control node 104 controlling the device node 108, can switch one or more of the power consumption units 504 to a lower power consumption mode than the current power consumption mode, using the electronic control circuitry 502. The revive engine 404, which can be responsive to commands sent by a control node 104 for controlling the device node 108, can switch one or more of the power consumption units 504 to a higher power consumption mode than the current power consumption mode using the electronic control circuitry 502.

To illustrate by example, consider a case of a device node 108 that is a laser printer. The laser printer can have several power consumption units 504. For example, the motor that drives the motion and flow of paper sheets can be a power consumption unit 504a, the heating elements supporting the printing process can be a power consumption unit 504b, the motor that runs the cooling fan can be a power consumption unit 504c, etc. At least one of the power consumption units 504 can be set to various power consumption modes. For example, the paper moving motor may be set to faster or slower modes, depending on how fast or slow the printer is printing, where the faster the motor runs the more power is consumed by the laser printer. Also, the cooling fan motor may be set to faster or slower modes, depending on the temperature of the printer case and/or printer operating environment, where the faster the motor runs the more power is consumed. Similarly, at least one power consumption unit 504 in at least one power managed device node 108 can be set at a point in time to one of a plurality of power consumption modes.

Global System Architecture

Figure 6:
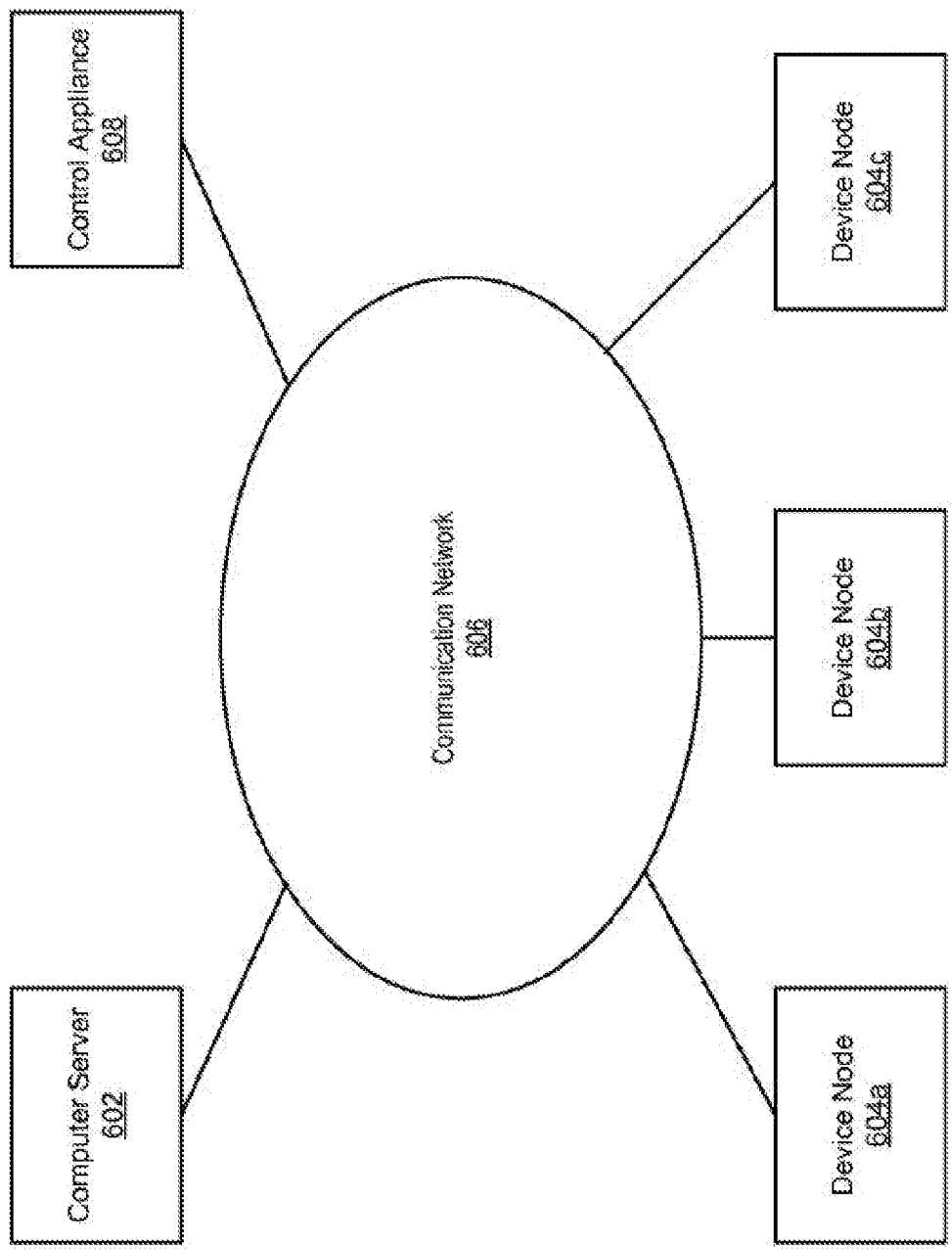
FIG. 6 is a block diagram of an example of a global system architecture for managing power at device nodes.

FIG. 6 is a block diagram of an example of global system architecture 600 for managing power at device nodes 604. The device nodes 604 are coupled to one or more computer servers 602a or control appliances 608 through a network 606. The network 606 can be, for example, the Internet, enterprise or corporate Intranets, the telephone network, a wireless network, etc. In some implementations, the control node 104 (FIG. 1) that power manages one or more device nodes 108 can be implemented in software on the computer servers 602, leveraging the hardware infrastructure provided by the computer servers 602. In another implementation, the control node 104 that power manages one or more of the device nodes 108 can be implemented as a separate control appliance 608 coupled to the communication network 606. The control appliance 608 can include software and hardware components for supporting the control node 104 functionalities, including electronic circuitry for running the software (e.g., special digital circuitry, embedded processor, microprocessor), digital storage, etc.

Collecting Operational and Power Usage Data

In some implementations, a device node 108 and a corresponding control node 104 monitor, collect and process operational and/or power usage data of the device node 108. Operational data can reflect the activities the device node 108 is undertaking. For example, data backups or virus scans for a personal computer, printing or idling for a printer, recording or idling for a camera with a motion sensor, etc. Power usage data can refer to how much power and for what purpose the device node 108 is consuming (perhaps, broken down per activity). For example, in a personal computer the operating system (e.g., Windows, Linux, Mac OS) can collect power usage data and send the data to a corresponding control node 102 in response to trigger events or on a scheduled basis (e.g., periodically). In another example, the corresponding control node 104 can install a software client on the device node 108 power managed by the control node 104 to collect operational and power usage data and upload the data to the control node 104.

Network Power Profiling

In some implementations, to leverage the power management functionalities of device nodes 108 and control nodes 104, the system 100 monitors and displays power usage profiles of one or more device nodes 108 coupled to or integrated with the communication network 606. The power usage profiles can be displayed in an suitable form for network operators and/or power managers. Device nodes 108 that couple to the network 606 components (e.g., switches, hubs, routers) which have power monitoring and management capabilities can be viewed as device nodes 108 and selected by the network operator and/or power manager for monitoring and display. The power usage profiles of device nodes 108 can include instantaneous power consumption, as well as a cumulative power consumption over time, and other statistics, averages, variances, etc. This data extracted from monitored device nodes 108 can be collected and deposited in a power consumption data repository (e.g., a database) at a processing facility (e.g., a server at a data center) and used to extract and build power usage profiles of monitored device nodes 108, which can be selected by a network operator and/or power manager. The power usage data and corresponding profiles can be processed and presented in appropriate graphic formats on a display facility (e.g., monitor, video wall, projection screen) for the network operator and/or power manager to view.

Therefore, the network operator and/or power manager can: 1) select one or more device nodes 108 coupled to the network 606 or integrated with the network 606 (e.g., switches, links), and 2) collect power usage data from these device nodes 108, and 3) view the profiles on a monitor. Hence, the network operator and/or power manager can then evaluate the power usage on the network and take appropriate measures and responses, for example, set alarms to sound when power usage exceeds certain thresholds, etc.

In some implementations, a system for managing power consumption of a device node attached to a communication node of a communication network includes an interface configurable for coupling to the communication node; and a controller coupled to the interface and operable for monitoring activity at the device node, and, responsive to detected activity at the device node, operable to send a command to the device node for setting the device node into an operational mode associated with power consumption. The operational mode can include turning the device node on or off.

The monitoring activity can include learning an activity pattern associated with the device node. The monitoring activity can include learning a usage pattern associated with the device node and a user. The monitoring activity can include learning a user location pattern associated with the device node and a user. The monitoring activity can include monitoring one or more of: user calendar information residing at the device node, user location relative to the device node, user login history associated with the device node, user usage history associated with the device node and user input entered at the device node.

The detected activity can be a sensed user activity in a device node environment (e.g., user motion detected by a motion sensor in the environment of the device node). The controller can be responsive to information other than detected activity (e.g., control rules). For example, the control can be responsive to a user response to a system request or communication. For example, the system 100 can display a pop up menu or other notification to the user at the device requesting input, then waiting for the input to determine if the user is currently present at the device node. If the device node has telephony capability (e.g., a mobile phone), then the system 100 can ring the device node and see if the user answers the ring. Similarly, the system 100 can send an email, Instant Message or other communication to the device node and wait for the user to answer. When the user responds, the user can provide identifying information to the system 100, so that activity, usage and/or location patterns associated with the user can be updated.

In some implementations, the controller can estimate a probability of a user being proximate to the device node (e.g., in the same location as the device node).

Deciding which Device Node to Quench/Revive

Referring to FIG. 1, consider the following exemplary operational scenario. A user has two device nodes 108: a computer at the office 108a and a computer at home 108b. The device nodes 108 are controlled by a control node 102a, where there is a deputy device engine 304a (FIG. 300) for the office computer 108a and a deputy device engine 304b for the home computer 108b, and the deputy device engines 304a, 304b are coordinated by the deputy supervisor engine 302. The control node 102a decides to set both device nodes 108a, 108b to a low operational mode where some services and functionalities, including Voice-over-IP (VoIP) telephony (e.g., Skype®), are disabled. Before putting both device nodes 108a, 108b into the low operational mode, the control node 102a informs the communication node 102 for which incoming communication messages to device nodes 108a, 108b pass, to divert the communication messages to the corresponding device deputy engines 304a, 304b of the device nodes 108a, 108b. Suppose now that a VoIP connection service request comes to the user from a caller. In this case, the communication node 102, through the communication detour engine 200, diverts the incoming message to the device deputy engines 304a, 304b of the device nodes 108a and 108b. The two device deputy engines 304a, 304b, which are coordinated and supervised by the deputy supervisor engine 302, decide between one or more of a plurality of alternatives, for example, including: dropping the request, redirecting the request to a voice box, reviving the VoIP capability on the home computer 108b only and directing the call to the home computer 108b, reviving the VoIP capability on the office computer 108a only and directing the call to the home computer 108a or revising the VoIP service on computers 108a, 108b and directing the call to computers 108a, 108b.

Device Control

This section describes how to estimate a location and likely future activity of a user. This section also describes how to use this estimation to select one or more actions to minimize energy consumption of a device node while limiting inconvenience to users. The goal of the device control is to derive estimators that require a limited amount of state information.

Overview

Figure 7:
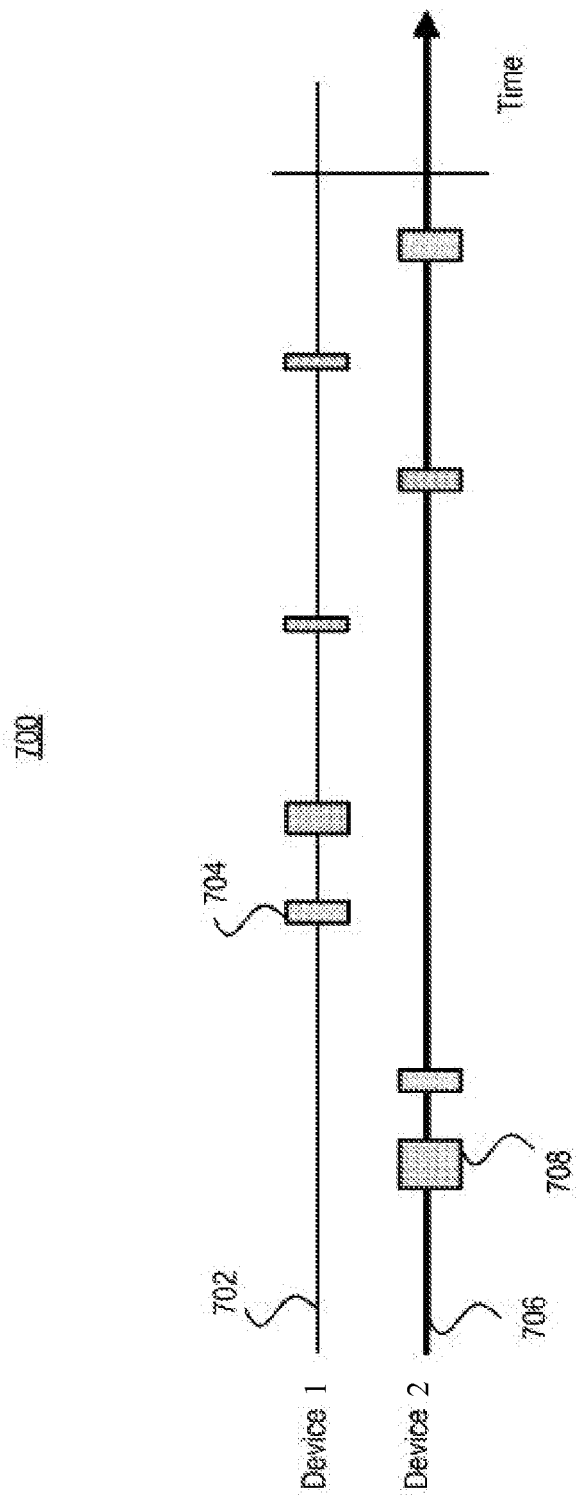
FIG. 7 illustrates an example activity traces for selecting power management actions for two different device nodes.

FIG. 7 illustrates example activity traces 700, 702 for selecting power management actions for two different devices. In an example scenario, a user regularly uses Device Node 1 and Device Node 2 in locations {1, 2, ..., N}. Assume that the system 100 knows when the user is actively using each device node, either through periodic polling or with a device-based client. Actively means activities that require the presence of the user, as opposed to applications that are running without the need for local user interactions. The activity trace 702 for Device Node 1 includes periods of activity 704 which are represented by shaded rectangles. Similarly, the activity trace 706 corresponding to Device Node 2 includes periods of activity 708. The longer the rectangle, the longer the period of activity. The power management system 100 monitors traces 700, 702 and selects appropriate power-saving actions based at least in part on the observations. Some examples of actions can include placing the device nodes in at least one of a number of possible states (e.g., OFF, ON, SLOW, SLEEP).

Actions

In some implementations, rules for determining actions can be described using conditional statements. For the rule descriptions that follow, T designates time until a device node is again active, where time can be measured in minutes or any other desired unit, S designates an event that some application should keep running in background at slow speed, F designates an event that an application must run in background at full speed, and P(A) is a marginal probability that the user is active during the next x minutes (e.g., 20 minutes).

RULE 1:
If user becomes inactive,
if P(T<120)<5%, then SLOW if S, ON if F, OFF otherwise;
if P(T<120)>5% and P(T<60)<5%, then SLOW if S, ON if F, SLEEP otherwise; or if P(T<20)>5%, then stay ON.

RULE 2:
If device is not ON, unless RULE 3 is active if P(A)>30%, ON;
if 10%<P(A)<30%, SLOW; or
if 5%<P(A)<10%, SLEEP.

RULE 3: If user of device is active on another device that is not close, cancel RULE 2.

The values in the rules described above can be adjusted. Moreover, the values may depend on a category of users. An estimator can use the activity traces 700, 702 to calculate relevant probabilities.

Estimation

The marginal probability, P(A), that a user is active can be estimated from collected data. For example, time can be divided into x-minute time epochs (e.g., 20 minute) for one or more days of the week. For each such epoch, P(t) is the probability that the user is actively using the device during that time epoch. One possible update of an estimate of P(t) can be $$P(t):=(1-a)P(t)+a1\{\text{user actively using device at } t\}. \quad [1]$$

When a new time epoch t occurs (e.g., after one week), the system 100 can update the estimate of the probability, P(t), according to a first order linear filter. In this expression, a is a real number between 0 and 1 that characterizes the ability of the estimator to adapt to changes in operating conditions. If a is close to one, then the estimator has a short memory and adapts fast to recent conditions; however, the estimator also tends to be less reliable. A suitable value of a can be determined by experiments. Using this estimate, one then calculates $$P(A)=\max\{P(t),P(t+1)\}, \quad [2]$$

where t is the time epoch of a current activity A.

One can use a different definition of epoch. For instance, one might use different durations and a different classification of days. For example, one might wish to have longer time epochs during the night and shorter time epochs at the beginning and end of the day and possibly around Noon. Also, neighboring epochs can be used to estimate the probability of activity A in a given time epoch t. For example, P(T<20), P(T<60), P(T<120) is the probability of time until a device node becomes active again.

For every time epoch t, if the user becomes inactive during the time epoch t, the system 100 can keep track of the time T(t) until the user becomes active on the device node again. The system 100 then updates estimates P(t; 20) of P(T<20) and corresponding estimates P(t; 60) and P(t; 120) as follows:

$$P(t;20):=(1-a)P(t;20)+a1\{T(t)<20\}, \quad [3]$$

and similarly for the other estimates.

User Location

Assume that the user is inactive at some time t and the system 100 wants to determine the user's most likely location. One approach is to compare the values of $$b(i)=P(t-2)+P(t-1)+P(t)+P(t+1)+P(t+2), \quad [4]$$

for different device nodes i. In [4], b(i) is an indication of the likelihood that the user is active around time t. The sum in [4] takes into account the uncertainty about the precise arrival time at a given location.

A more complex procedure can be used to bias the location estimate using a last active device node and a time since the last detected activity at the device node. For example, if the user was last seen active at device node i and then he stopped being active s time units before time t. One could use a location estimate given by $$q(j)=1\{j=i\}\exp\{-Ks\}+(1-\exp\{-Ks\})b(j)/[b(1)+ \ldots +b(N)]. \quad [5]$$

The justification for this estimator is that when s is small, the user is likely to be close to the device i the user last used and when s is large, the user is more likely to have moved to the device node used by the user most often around that time.

Example Control Flow

Figure 8:
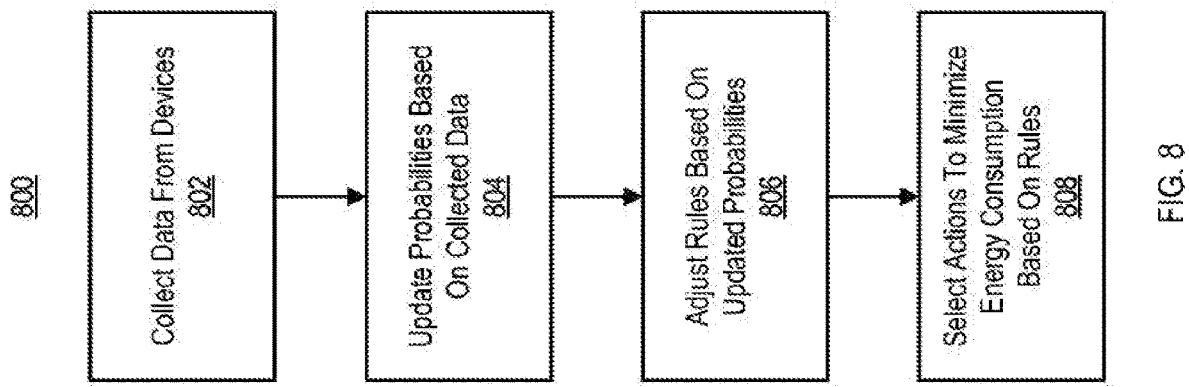
FIG. 8 is a flow diagram of an example control process for the power management system of FIG. 1.

FIG. 8 is a flow diagram of control process 800 for the power management system of FIG. 1. In some implementations, the system 100 can poll devices periodically and/or in response to a trigger event. The process 800 can begin by collecting data from a device node (802). The data collected from the device node can be used to make various determinations, including but not limited to the following determinations:

Is the device node active at the polling time?
Are there background tasks running at the device node?
  Are the tasks of type S (slow) or F (fast)?
Who is the user logged on the device node?
A marginal probability, P(A), that a user is in an (A)ctive state during the next x minutes (or any desired unit of time) can be updated based on the collected data (804). For example, based on the collected data the following statistics can be updated:

P(t)=P(active at time t).
Update equation: $P(t):=(1-a)P(t)+a \, 1$ {user actively using device at t}.
P(t; x)=P(inactive device at t becomes active again within x minutes).
Update procedure:
If device becomes inactive at t, start register with T(t)=0;
At time t+1, if device is still inactive, add x time to T(t); else add y time to T(t);
Repeat until device becomes active again;
The result of this update procedure is a new sample value of T(t);

$$P(t;x):=(1-a)P(t;x)+a1\{(0<x\}.$$

q(j; t)=P(User is close to device i at time t).
Update procedure.

$$q(j;t)=1\{j=i\}\exp\{-Ks\}+(1-\exp\{-Ks\})b(j)/[b(1)+ \ldots +b(N)]$$

where s=last time that the user was active at device i; i=that device;

$$b(i)=P(t-2)+P(t-1)+P(t)+P(t+1)+P(t+2) \text{ for device } i.$$

P(S)=probability that user finds device in a (S)leep state when the user wants to use the device.
Update procedure. When system polls device at time t and finds it active whereas the device was in the Sleep state at time t−1, the system notes S(t)=1; otherwise S(t)=0. Then $P(S):=(1-a)P(S)+a \, S(t)$.
P(O)=probability that user finds device node in an (O)ff state when he wants to use the device node.
Update procedure. When system polls device at time t and finds the device active whereas the device was in the Off state at time t−1, the system notes 0(t)=1; otherwise 0(t)=0. Then $P(A):=(1-a)P(A)+a \, O(t)$.

Next, control rules can be adjusted based on the updated probabilities (806). A goal of this step is to tune the control rules to make sure that targets defined by a device node profile are met. These targets concern the probability that the user finds the device node in a Sleep or Off state when the user wants to use the device node.

If P(0) exceeds the target, then the system 100 should wake up more aggressively or turn off less frequently. This can be accomplished by replacing the 5% in the first part of Rule 1 by 4%, replacing 4% by 3%, and so on. If P(0) is smaller than the target, then one replaces 5% by 6%, etc. P(S) can be adjusted in a manner similar to adjusting P(0).

Power-saving actions can be selected based on the adjusted control rules (808). Power-saving actions can include but are not limited to placing the device node in a new state (e.g., Off, On, Slow, Fast).

As previously noted, a device node 108 may have multiple users such as a local user at the device node itself and another user such as a remote user acting as a system administrator responsible for maintenance. As also previously described, the value P(A) is a marginal probability that a user is active on a device node during a next designated time period. Thus, each user of a device node will have a marginal probability P(A) value that can be used, among other things, to implement the previously described control rules for determining action, e.g., Rule 1, Rule 2 and Rule 3. Appropriate power savings actions can then be selected based upon the combination of the control rules.

What is claimed is:

1. A method of managing power consumption of a device coupled to a communication device of a communication network by way of a communication link, the method comprising:
  obtaining an activity value for the device, where the activity value corresponds to a concluded time epoch and represents a level of activity generated by at least one of no activity, one activity or a plurality of activities undertaken at the device during the concluded time epoch;
  correlating the concluded time epoch to at least one past time epoch;
  weighting a probability value for the device corresponding to the at least one past time epoch to obtain a weighted probability value;
  weighting the activity value for the device corresponding to the concluded time epoch to obtain a weighted activity value;
  calculating an updated probability value for the device corresponding to the at least one past time epoch and the concluded time epoch using the weighted probability value for the device and the weighted activity value for the device;
  generating automatically, a command for a current or a future time epoch based, in part, on the updated probability value; and
  sending the automatically generated command based on the updated probability value, from a control node through the communication link to the device, for setting the device into an operation mode for the current or the future time epoch where the operation mode uses a different amount of power than a previous operation mode of the device prior to execution of the automatically generated and sent command.

2. The method of claim 1, wherein the weighted activity value is calculated with a weighting factor set to a value a, where a is a real number between 0.0 and 1.0, and the weighted probability value is calculated with a weighting factor set to (1−a).

3. The method of claim 1, wherein the automatically generated and sent command is further based on one or more of: a user response to a system request or communication, user calendar information, detected activity at the device or a second device.

4. The method of claim 1, wherein the automatically generated and sent command includes turning the device on or off.

5. The method of claim 1, wherein the automatically generated and sent command is sent to the device by the control node in response to a trigger of one or more of: a detected activity at the device, or the control node determining that a user has gone inactive on the device.

6. The method of claim 5, wherein the weighted activity value is calculated with a weighting factor set to a value a, where a is a real number between 0.0 and 1.0, and the weighted probability value is calculated with a weighting factor set to (1−a).

7. The method of claim 5, wherein the automatically generated and sent command is further based on one or more of: a user response to a system request or communication, user calendar information, detected activity at the device or a second device.

8. The method of claim 5, wherein the automatically generated and sent command includes turning the device on or off.

9. The method of claim 5, wherein the automatically generated and sent command to the device is based on a first and a second comparison of the updated probability value with a first and a second probability threshold value respectively wherein the operation mode and the previous operation mode are two of at least three possible operation modes.

10. The method of claim 5, where the automatically generated and sent command is based, in part, on mathematically combining the updated probability value for the at least one past time epoch and another probability value correlating to another time epoch neighboring the at least one past time epoch.

11. The method of claim 10, wherein the weighted activity value is calculated with a weighting factor set to a value a, where a is a real number between 0.0 and 1.0, and the weighted probability value is calculated with a weighting factor set to (1−a).

12. The method of claim 1, wherein the automatically generated and sent command to the device is based on a first and a second comparison of the updated probability value with a first and a second probability threshold value respectively wherein the operation mode and the previous operation mode are two of at least three possible operation modes.

13. The method of claim 12, wherein the weighted activity value is calculated with a weighting factor set to a value a, where a is a real number between 0.0 and 1.0, and the weighted probability value is calculated with a weighting factor set to (1−a).

14. The method of claim 12, wherein the automatically generated and sent command is further based on one or more of: a user response to a system request or communication, user calendar information, detected activity at the device or a second device.

15. The method of claim 12, wherein the operation mode is sleep or slow.

16. The method of claim 12, where the automatically generated and sent command is based, in part, on mathematically combining the updated probability value for the at least one past time epoch and another probability value correlating to another time epoch neighboring the at least one past time epoch.

17. The method of claim 16, wherein the weighted activity value is calculated with a weighting factor set to a value a, where a is a real number between 0.0 and 1.0, and the weighted probability value is calculated with a weighting factor set to (1−a).

18. The method of claim 16, wherein the automatically generated and sent command is further based on one or more of: a user response to a system request or communication, user calendar information, detected activity at the device or a second device.

19. The method of claim 16, wherein the operation mode is sleep or slow.

20. The method of claim 16, wherein the automatically generated and sent command is sent to the device by the control node in response to a trigger of one or more of: a detected activity at the device, or the control node determining that a user has gone inactive on the device.

21. The method of claim 20, wherein the weighted activity value is calculated with a weighting factor set to a value a, where a is a real number between 0.0 and 1.0, and the weighted probability value is calculated with a weighting factor set to (1−a).

22. The method of claim 1, where the automatically generated and sent command is based, in part, on mathematically combining the updated probability value for the at least one past time epoch and another probability value correlating to another time epoch neighboring the at least one past time epoch.

23. The method of claim 22, wherein the weighted activity value is calculated with a weighting factor set to a value a, where a is a real number between 0.0 and 1.0, and the weighted probability value is calculated with a weighting factor set to (1−a).

24. The method of claim 22, wherein the automatically generated and sent command is further based on one or more of: a user response to a system request or communication, user calendar information, detected activity at the device or a second device.

25. The method of claim 22, the automatically generated and sent command includes turning the device on or off.

* * * * *